United States Patent [19]

Cronin et al.

[11] Patent Number: 5,330,735
[45] Date of Patent: Jul. 19, 1994

[54] PURIFICATION OF HYDROCHLORIC ACID

[75] Inventors: Kirk A. Cronin, Freeland, Mich.; William A. Evanko, Golden, Colo.; Alireza Malekadeli, Midland, Mich.

[73] Assignee: Dow Corning Corporation, Midland, Mich.

[21] Appl. No.: 6,412

[22] Filed: Jan. 21, 1993

[51] Int. Cl.$^5$ ............................................. C01B 7/07
[52] U.S. Cl. .................................. 423/488; 423/481; 210/692; 210/670; 210/674
[58] Field of Search ................ 423/481, 488; 210/670, 210/673, 674, 692

[56] References Cited

U.S. PATENT DOCUMENTS

| | | | |
|---|---|---|---|
| 2,695,875 | 10/1954 | McGarvey | 423/488 |
| 3,531,463 | 9/1970 | Gustafson | 210/692 |
| 3,720,626 | 3/1973 | Benzaria et al. | 210/674 |
| 4,125,594 | 11/1978 | Su et al. | 423/488 |
| 5,124,362 | 6/1992 | Auerswald et al. | 210/670 |

FOREIGN PATENT DOCUMENTS

| | | | |
|---|---|---|---|
| 249190 | 9/1987 | German Democratic Rep. | 423/488 |
| 2-233503 | 9/1990 | Japan | 423/488 |
| 3-28102 | 2/1991 | Japan | 423/488 |
| 462593 | 5/1975 | U.S.S.R. | 210/673 |

*Primary Examiner*—Wayne Langel
*Assistant Examiner*—N. M. Nguyen
*Attorney, Agent, or Firm*—Robert L. McKellar; Richard D. Streu; Richard I. Gearhart

[57] ABSTRACT

A process is described by which numerous waste or by-product aqueous hydrochloric acid streams can be purified by contacting the aqueous hydrochloric acid with a polystyrenic based resin to remove silicon containing impurities and thereby allowing the hydrochloric acid to be re-used for various applications.

11 Claims, No Drawings

PURIFICATION OF HYDROCHLORIC ACID

BACKGROUND OF THE INVENTION

A wide variety of commercial silicone polymers are produced by the hydrolysis of a few basic chlorosilanes. These important chlorosilane monomers are produced by processes that also yield aqueous hydrochloric acid as a major by-product. For example, the hydrolysis of dimethyl-dichlorosilane yields 2 moles of hydrogen chloride for every mole of chlorosilane hydrolyzed. Because of the commercial importance of these and other processes for producing chlorosilanes, large amounts of by-product aqueous hydrochloric acid streams are generated.

Aqueous hydrochloric acid resulting as a by-product from the hydrolysis of chlorosilanes, as well as from other sources, is often contaminated with silicon containing materials, primarily silanols and siloxanes. Additionally other contaminants may be present such as solvents, hydrocarbons, and chlorinated hydrocarbons. Removal of these materials has proven a problem, particularly when relatively small concentrations of these materials are objectionable.

The bulk of these materials may phase separate as an oil layer on the aqueous hydrochloric acid and thus can be separated utilizing various techniques, but there remains small concentrations, typically below about 1000 milligrams per liter (mg/l), of these materials which are still soluble or stable in the aqueous hydrochloric acid. Some of this by-product hydrochloric acid can be reused for various commercial applications if it is cleaned up.

However, much of the aqueous hydrochloric acid ends up as waste streams that must be neutralized and disposed of because the level of undesirable contaminants prevents its use for many applications. This represents not only an economic loss of a valuable source of chloride ion for commercial production of chlorosilane intermediates but also poses a potential negative impact on the environment, by impacting the level of total dissolved solids present in commercial wastewater streams.

To the applicants knowledge, there does not seem to be any patents or other publications directed to the separation of soluble or stable silanols and siloxanes from aqueous hydrochloric acid. Such silanols and siloxanes are reactive and can undergo condensation polymerization when in contact with hydrochloric acid.

One object of this present invention is to provide a process by which aqueous hydrochloric acid can be more easily purified. Another object is to provide a process by which small concentrations of silicon containing impurities can be more easily removed from aqueous hydrochloric acid such that the hydrochloric acid is made suitable for re-use. Still another object of this invention is to economically refurbish aqueous hydrochloric acid streams to greatly reduce the chloride ion that must be neutralized and disposed of. These and other objects of this invention will become apparent to one of ordinary skill in the art after reading this specification.

BRIEF SUMMARY OF THE INVENTION

This invention relates to a process for removing undesirable silicon containing materials from aqueous hydrochloric acid thereby allowing the hydrochloric acid to be re-used for various commercial uses, the process comprising the steps of (I) contacting the hydrochloric acid with a polystyrenic based adsorptive resin, in the liquid phase, for a time sufficient to allow any silicon-containing materials contained in said hydrochloric acid to adsorb on the polystyrenic resin thereby treating said hydrochloric acid, and (II) separating the treated hydrochloric acid from the polystyrenic resin. This significantly reduces the quantity of hydrochloric acid that ends up as waste streams from commercial processes.

DETAILED DESCRIPTION OF THE INVENTION

The process described and claimed herein is a process for treating aqueous hydrochloric acid to remove silicon-containing materials. The process comprises contacting contaminated aqueous hydrochloric acid with a polystyrenic based adsorptive resin for a time sufficient to allow any silicon-containing materials in the aqueous hydrochloric acid to adsorb on the polystyrenic resin; followed by separating the treated aqueous hydrochloric acid from the polystyrenic resin.

The apparatus and the method steps of this process are not narrowly critical as long as the essential step of contacting the aqueous hydrochloric acid with the polystyrenic resin is achieved. The polystyrenic resin may be mixed with the aqueous acid in a suitable vessel to achieve contact and subsequently separated from the treated hydrochloric acid, for example by filtration. However, it is preferred that the aqueous acid be passed through a suitable packed bed of polystyrenic resin to facilitate handling of commercial aqueous hydrochloric acid streams. This may be done in a batch, semi-continuous or continuous mode to achieve the desired reduction in silicon containing materials. The use of multiple beds of polystyrenic resin may also be used according to the method of this invention. In order to gain the advantages of this process the hydrochloric acid must be in the liquid state during the contact with the polystyrenic resin.

Temperatures in the range of 0° to 65° C. are suitable if sufficient contact time between the polystyrenic resin and the aqueous acid are maintained and the acid remains in the liquid phase.

For purposes of this invention, the polystyrenic based adsorptive resin useful herein is understood to be a polystyrenic based resin having a hydrophobic surface. These resins are typically supplied as nearly dry beads comprising a highly crosslinked styrenic type polymer having an average particle size in the range of from 840 to 297 micrometers (mesh size of 20–50). Polystyrenic based resins having a hydrophobic surface, such as XUS-43436 Adsorbent Resin (Dow Chemical Company, Midland, Mich.) and XUS-40323 Sorptive Polymer (Dow Chemical Company, Midland, Mich.) are preferred. The surface area of the resin has an effect on the resin's ability to adsorb silicon containing materials. A surface area ($m^2$/gm) of at least 650 is preferred. A surface area of at least about 1200 is most preferred.

The term refurbishment is understood to mean suitable for re-use. For example to say that the aqueous HCl is refurbished by the process of this invention, means that the impurities in the HCl have been reduced to such a level as to make the HCl usable in the same or similar process applications in that the purity of the HCl is essentially equivalent to what it was prior to being used in the process application. To say that the polystyrenic based adsorptive resin is refurbished means that the level of silicon containing impurities have been removed from the surface of the resin to such an extent that the resin is useful again for treating aqueous HCl. Silicon materials or impurities are defined for the purpose of this invention to be any silane, silanol or siloxane which is soluble or stable for an extended period of time in aqueous hydrochloric acid. For example, in a typical hydrolysis process stream, the bulk of the siloxanes phase separate almost immediately from the aqueous acid layer. Some of the silanes and siloxanes formed are present as a colloidal suspension that can be physically removed from the bulk aqueous phase. However, small portions of these silicon-containing materials ranging below about 1000 mg/l are stable in the aqueous phase indefinitely or for at least a period of time ranging from several hours to several days. It is this last range of materials that is the topic of concern for the present invention. As one skilled in the art would understand, both the level of soluble silicon containing material and its affinity for aqueous HCl are very dependent on the functionality and molecular size of the silicon material. Both monomers and short chained siloxanes of a molecular weight up to about 500 may be soluble or stable in aqueous HCl The concentration of the HCl also has a bearing on the solubility of various silicon containing materials. The present invention is therefore not limited to a specific silicon-containing functionality, it has been found that aqueous HCl streams from a wide variety of silane and siloxane processes are suitable for purification by the process of the present invention. For example, streams containing methyl, phenyl, vinyl, organofunctional, hydrogen, hydroxide and chlorine, as well as other functionalities of commercial importance, on silicon are suitable for the process of the present invention.

For purposes of this invention, "contaminated" aqueous hydrochloric acid is hydrochloric acid from any source contaminated with silanols, siloxanes, solvents, hydrocarbons or chlorinated hydrocarbons. Of special importance is aqueous hydrochloric acid from the hydrolysis processes of various chlorosilanes, such processes including but not limited to the hydrolysis of methyl, vinyl, phenyl, hydrogen, organofunctional, chlorinated hydrocarbon, and fluorinated hydrocarbon containing chlorosilanes. The process of this invention is not limited by the HCl concentration of the aqueous hydrochloric acid; aqueous streams of hydrochloric acid (HCl) in the range of 1 to 36 percent by weight as hydrogen chloride are suited for refurbishment by the method of this invention. Average contact time between the polystyrenic resin and the aqueous hydrochloric acid in the range of 5 to 60 minutes results in effluent HCl containing a "significantly reduced amount" of silicon materials, measured as atomic Si. The meaning of "significantly reduced amount" is dependent on the silicon content of the HCl feed. When the HCl feed contains more than about 500 mg/l as silicon, a "significantly reduced amount" is understood to mean that at least 75% of the silicon-containing impurities are removed from the HCl feed. When the HCl feed contains below 500 mg/l as silicon a "significantly reduced amount" is understood to mean that at least 90% of the silicon-containing impurities are removed from the HCl feed. In most cases more than 90% of the silicon-containing impurities are removed from the HCl feed by passage of the liquid through suitable polystyrenic resin adsorption columns. The effluent streams of purified HCl usually contain less than 100 mg/l as silicon and in many cases less than 25 mg/l as silicon. In a preferred embodiment of the present invention having a minimum contact time of 30 minutes, all examples evaluated resulted in less than 20 mg/l as silicon in the effluent HCl.

The capacity of most of the resins examined in the process of this invention was in the range of 400 to 900 grams HCl/gram of polystyrenic resin. As the capacity of the polystyrenic resin column is approached the silicon content in the effluent increases. When the silicon content of the effluent reaches about 150 mg/l as silicon, the column is said to have reached the silicon "breakthrough" level and is considered to be nearly exhausted. If more HCl is passed through the column after "breakthrough" has been reached the silicon content of the effluent will rapidly rise to high levels which will approach the level of silicon in the feed HCl. Naturally, this definition of "breakthrough" does not apply if one is attempting to purify an HCl stream containing less than 150 parts per million by weight (ppm) silicon.

As noted above, a point is reached when the capacity of polystyrenic resin towards silicon containing materials is reached. Thus, the process of this invention further relates to a process where the polystyrenic resin of (II) is further treated to refurbish it, the refurbishment comprising (i) treating the polystyrenic resin containing silicon-containing materials with water until the water has a pH in the range of 3 to 7; (ii) treating the polystyrenic resin from (i) with a mixture of a base and solvent for a period of time in the range of 15 to 60 minutes; (iii) separating the polystyrenic resin from the mixture of (ii); and (iv) treating the polystyrenic resin from (iii) with water until the water has a pH in the range of 7 to 8.

In a preferred embodiment of the present invention the refurbishment of the polystyrenic resin could comprise the additional step of heating the resin after the separation step (iii) to further remove solvent residue from the resin, the refurbishment comprising (i) treating the polystyrenic resin containing silicon-containing materials with water until the water has a pH in the range of 3 to 7; (ii) treating the polystyrenic resin from (i) with a mixture of a base and solvent for a period of time in the range of 15 to 60 minutes; (iii) separating the polystyrenic resin from the mixture of (ii); (iv) heating the polystyrenic resin from (iii) for a period of time in the range of 0.5 to 4 hours at a temperature in the range of 70° to 150° C.; (v) cooling the polystyrenic resin from (iv) to below about 50° C.; and (vi) treating the polystyrenic resin from (v) with water until the water has a pH in the range of 7 to 8.

The bases suitable for the present invention are selected from the group consisting essentially of sodium hydroxide and potassium hydroxide in the range of 1 to 20% by weight. Bases in the range of 5 to 15% by weight are particularly well suited for use in the present invention.

The solvents suitable for use in the present invention are selected from the group consisting essentially of methanol, ethanol, isopropyl alcohol, water and mixtures thereof. The mixtures of alcohols with water described hereinabove are understood to be in any proportions for the purposes of this invention. For example, in the mixture case of methanol and water the suitable range of said mixture covers from 100% methanol to 100% water and all proportions in between.

The apparatus used for refurbishment of the polystyrenic resin is not critical, it could be done in a batch, semi-continuous, or continuous mode. For example the resin could be refurbished in any suitable vessel which allowed contact of the resin with the base/water or base/alcohol. In a preferred embodiment of the present invention, the polystyrenic resin could be refurbished in the same packed column used for treating the HCl. A series of columns which could be operated in series or parallel to allow treatment of aqueous HCl or refurbishment of the polystyrenic resin is within the scope of the present invention.

The following examples are to illustrate the invention and are not to be regarded as limiting.

Analysis for silicon content in the following examples was by two methods; x-ray fluorescence for analysis of the silicon content of the resin and atomic adsorption spectrometry for analysis of the silicon content of the aqueous HCl. Silicon was measured at the atomic level as milligrams per liter (mg/l) unless otherwise specified.

EXAMPLE 1

This example demonstrates the ability of the polystyrenic resin to remove silicon containing materials and the capability to regenerate the polystyrenic resin once silicon "breakthrough" had occurred and the resin bed had reached its capacity for silicon containing materials. Five CPVC (copolyvinylchloride) columns were connected together in series so that the acid feed stream would contact the adsorbent sequentially in each column before leaving the system. Each column was 5 cm in diameter by 90 cm long. Each column was packed to a height of approximately 60 centimeters with 600 grams of XUS-43436 Adsorbent Resin (Dow Chemical Company, Midland, Mich.). Once the adsorbent was loaded, the columns were filled with deionized water and pressure tested to a gauge pressure of 482.6 kPa (70 psi). The column unit was then connected to a waste aqueous hydrochloric acid stream (18% by weight as HCl) with a gauge pressure of 275.8 kPa (40 psi) from a methyl-chlorosilane hydrolysis process. Sample points were located at the effluent of each column before the acid stream was fed into the subsequent column. The residence time that the aqueous acid was in contact with the resin was 30 minutes.

Contaminated aqueous hydrochloric acid was fed through the system until the atomic silicon level of the effluent from the first column showed the same level of silicon impurities as in the feed stream, an average of 516 mg/l. For purposes of this invention this point at which the effluent stream from the first column showed the same level of silicon impurities as in the feed stream was called "spent". The effluent from the combined columns remained at an average of 3 mg/l as atomic silicon throughout the run. 1405 kilograms of acid were treated before the first column became "spent".

The polystyrenic resin from the first column was used to evaluate various refurbishment techniques. Water, methanol, heptane, 10 % by weight of sodium hydroxide in water, and 10 % by weight of sodium hydroxide in methanol were tested for their ability to remove silanols and siloxanes from the polystyrenic resin. The use of water and heptane are for comparative purposes and are not within the scope of this invention. 1000 grams of each of the aforementioned solutions and 100 grams of spent polystyrenic resin were loaded into a Pyrex ® reaction flask. The mixture was heated to its boiling point and refluxed for four hours and then cooled to below 50° centigrade. After cooling, the adsorbent was filtered from the solvent. The adsorbent was washed with deionized water until the water had a pH in the range of 7 to 8, then dried in an oven at 120° centigrade for 16 hours. The refurbished adsorbent was analyzed for silicon content by X-Ray Florescence.

Table 2 shows the results of the various refurbishment techniques. The spent resin represents the resin sampled from column 1 after the effluent silicon concentration reached the same value as the inlet silicon concentration. The value of 100% means that all the silanols and siloxanes adsorbed during the processing were still present on the resin. The value of 0% for the new resin represents the polystyrenic resin as received from the manufacturer, containing no silanols or siloxanes. The range between 0 and 100 was an indicator of the effectiveness of the particular refurbishment technique used. The more effective the refurbishment technique, the lower the value of the percent silicon remaining on the resin, thus indicating that more of the silicon materials were removed.

The data reported in Table 2 demonstrates the effectiveness of removing the silicon from the spent resin using 10% by weight of sodium hydroxide (NaOH) in methanol or water compared to water, methanol, or heptane alone. In the case of the NaOH/methanol solution only 4% of the silicon remained after refurbishment and in the case of the NaOH/water solution, 45% of the silicon remained after refurbishment.

TABLE 2

| Comparison of Refurbishment Techniques | |
|---|---|
| Technique | % Silicon Present on the Resin |
| Spent Resin | 100 |
| Water | 100 |
| Heptane | 74 |
| Methanol | 61 |
| 10% NaOH in Water | 45 |
| 10% NaOH in Methanol | 4 |
| New Resin | 0 |

EXAMPLE 2

The resin from Example 1, was evaluated for its ability to remove silicon-containing materials after it had undergone the refurbishment described hereinabove. The resin was loaded into column 1 and evaluated using the procedures described hereinabove with the exception that the effluent from column 1 was not connected in series to the other columns. The HCl feed contained an average level of silicon-containing impurities of 693 mg/l. Effluent from the column averaged 4 mg/l as silicon.

What is claimed is:

1. A process for treating contaminated aqueous hydrochloric acid to remove silane, silanol, or siloxane contained in said hydrochloric acid, the process comprising:
    (I) contacting said hydrochloric acid with a hydrophobic polystyrenic resin for a time sufficient to adsorb said silane, silanol, or siloxane contained in said hydrochloric acid onto the hydrophobic polystyrenic resin, thereby treating said hydrochloric acid; and
    (II) separating the treated aqueous hydrochloric acid from the hydrophobic polystyrenic resin.

2. A process as claimed in claim 1 wherein the aqueous hydrochloric acid concentration is between 1 to 36% by weight as hydrogen chloride.

3. A process as claimed in claim 1 wherein the hydrophobic polystyrenic resin of (II) is further treated to refurbish it, the refurbishment comprising
   (i) treating the hydrophobic polystyrenic resin containing silicon-containing materials with water until the water has a pH in the range of 3 to 7;
   (ii) treating the hydrophobic polystyrenic resin from (i) with a mixture of base and solvent for a period of time in the range of 15 minutes to 60 minutes;
   (iii) separating the hydrophobic polystyrenic resin from the mixture of (ii); and
   (iv) treating said hydrophobic polystyrenic resin from (iii) with water until the water has a pH in the range of 7 to 8.

4. A process claimed as in claim 3 wherein the base is selected from the group consisting of sodium hydroxide and potassium hydroxide.

5. A process claimed as in claim 3 wherein the solvent is selected from the group consisting of methanol, ethanol, isopropyl alcohol, water, and mixtures thereof.

6. A process as claimed in claim 1 wherein the hydrophobic polystyrenic resin of (II) is further treated to refurbish it, the refurbishment comprising
   (i) treating the hydrophobic polystyrenic resin containing silicon-containing materials with water until the water has a pH in the range of 3 to 7;
   (ii) treating the hydrophobic polystyrenic resin from (i) with a mixture of base and solvent for a period of time in the range of 15 minutes to 60 minutes;
   (iii) separating the hydrophobic polystyrenic resin from the mixture of (ii);
   (iv) heating the hydrophobic polystyrenic resin from (iii) for a period of time in the range of 0.5 to 4 hours at a temperature in the range of 70° to 150° centigrade.
   (v) cooling the hydrophobic polystyrenic resin from (iv) to below about 50° centigrade; and
   (vi) treating said hydrophobic polystyrenic resin from (v) with water until the water has a pH in the range of 7 to 8.

7. A process claimed as in claim 6 wherein the base is selected from the group consisting of sodium hydroxide and potassium hydroxide.

8. A process claimed as in claim 6 wherein the solvent is selected from the group consisting of methanol, ethanol, isopropyl alcohol, water, and mixtures thereof.

9. Hydrochloric acid when treated by the process of claim 1.

10. Hydrochloric acid when treated by the process of claim 3.

11. Hydrochloric acid when treated by the process of claim 6.

* * * * *